US011807269B2

(12) United States Patent
Cai et al.

(10) Patent No.: US 11,807,269 B2
(45) Date of Patent: Nov. 7, 2023

(54) METHOD FOR VEHICLE AVOIDING OBSTACLE, ELECTRONIC DEVICE, AND COMPUTER STORAGE MEDIUM

(71) Applicant: BEIJING BAIDU NETCOM SCIENCE AND TECHNOLOGY CO., LTD., Beijing (CN)

(72) Inventors: Jiakun Cai, Beijing (CN); Ke Tang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 111 days.

(21) Appl. No.: 17/234,969

(22) Filed: Apr. 20, 2021

(65) Prior Publication Data

US 2021/0237771 A1 Aug. 5, 2021

(30) Foreign Application Priority Data

Jun. 30, 2020 (CN) .......................... 202010622354.5

(51) Int. Cl.
*B60W 60/00* (2020.01)
*B60W 40/12* (2012.01)
(Continued)

(52) U.S. Cl.
CPC ...... *B60W 60/0011* (2020.02); *B60W 40/105* (2013.01); *B60W 40/12* (2013.01); *G06V 20/58* (2022.01); *B60W 2554/806* (2020.02)

(58) Field of Classification Search
None
See application file for complete search history.

(56) References Cited

U.S. PATENT DOCUMENTS 10,471,954 B2 11/2019 Saiki
2015/0178575 A1\* 6/2015 Fukata .................... G06T 7/285
382/103
(Continued)

FOREIGN PATENT DOCUMENTS

CN 109270933 A 1/2019
CN 109435946 A 3/2019
(Continued)

OTHER PUBLICATIONS

Office Action issued in corresponding JP Application No. 2021-090068 with English translation dated May 31, 2022 (18 pages).
(Continued)

*Primary Examiner* — Anne Marie Antonucci
*Assistant Examiner* — Amelia Vorce
(74) *Attorney, Agent, or Firm* — Osha Bergman Watanabe & Burton LLP

(57) ABSTRACT

Embodiments of the disclosure disclose a method for a vehicle avoiding an obstacle, an electronic device, and a computer storage medium, and relates to a field of unmanned driving technologies. The detailed implementation includes: obtaining size information of a vehicle; obtaining a safe distance in a traveling direction of the vehicle; determining an obstacle screening area of the vehicle at least based on the size information and the safe distance; and determining an obstacle avoiding path of the vehicle in response to determining that the obstacle is located in the obstacle screening area. With the technical solution of the disclosure, higher efficiency obstacle avoiding can be realized.

18 Claims, 4 Drawing Sheets

(51) Int. Cl.
*B60W 40/105* (2012.01)
*G06V 20/58* (2022.01)

(56) References Cited

U.S. PATENT DOCUMENTS

| | | | |
|---|---|---|---|
| 2017/0106750 A1 | 4/2017 | Tauchi et al. | |
| 2018/0327009 A1* | 11/2018 | Takagawa | G05D 1/0214 |
| 2019/0056739 A1* | 2/2019 | Sunil Kumar | G05D 1/0268 |
| 2019/0084566 A1* | 3/2019 | Park | G05D 1/0287 |
| 2019/0243371 A1* | 8/2019 | Nister | G05D 1/0242 |
| 2019/0299984 A1* | 10/2019 | Shalev-Shwartz | G01S 17/931 |
| 2020/0050195 A1* | 2/2020 | Gross | G05D 1/0242 |
| 2020/0057487 A1* | 2/2020 | Sicconi | G06T 7/254 |
| 2020/0081443 A1* | 3/2020 | Nakata | G05D 1/024 |
| 2020/0172096 A1* | 6/2020 | Lord | G01S 13/931 |
| 2020/0180615 A1 | 6/2020 | Yang et al. | |
| 2020/0189590 A1* | 6/2020 | Luo | B60W 60/0011 |
| 2020/0391729 A1* | 12/2020 | Liu | B60W 50/029 |
| 2021/0001841 A1 | 1/2021 | Wang et al. | |
| 2021/0064892 A1* | 3/2021 | Adelsberger | G06V 20/588 |
| 2021/0262808 A1 | 8/2021 | Wang et al. | |
| 2021/0362705 A1* | 11/2021 | Singh | E02F 9/261 |

FOREIGN PATENT DOCUMENTS

| | | | | |
|---|---|---|---|---|
| CN | 110550029 A | | 12/2019 | |
| CN | 110782705 A | | 2/2020 | |
| CN | 110794851 A | * | 2/2020 | ........... G05D 1/0214 |
| CN | 110852244 A | | 2/2020 | |
| CN | 110867132 A | | 3/2020 | |
| CN | 111332285 A | | 6/2020 | |
| DE | 102018215695 A1 | * | 3/2020 | ........ B60W 60/0011 |
| JP | 2008242544 A | | 10/2008 | |
| JP | 2012234408 A | | 11/2012 | |
| JP | 2015197706 A | | 11/2015 | |
| KR | 20190126416 A | | 11/2019 | |
| WO | 2011145141 A1 | | 11/2011 | |
| WO | 2020107974 A1 | | 6/2020 | |

OTHER PUBLICATIONS

Extended European Search Report issued in corresponding EP Application No. 21169541.6 dated Oct. 4, 2021 (12 pages).
Office Action issued in Korean Application No. 10-2021-0058402, dated May 23, 2023 (15 pages).
Office Action issued in Chinese Application No. 202010622354.5, dated Aug. 31, 2023 (20 pages).

* cited by examiner

METHOD FOR VEHICLE AVOIDING OBSTACLE, ELECTRONIC DEVICE, AND COMPUTER STORAGE MEDIUM

CROSS REFERENCE TO RELATED APPLICATION

This application is based on and claims priority to Chinese patent application No. 202010622354.5, filed on Jun. 30, 2020, the entire content of which is hereby introduced into this application as a reference.

FIELD

The disclosure relates to a field of unmanned driving technologies, and particularly relates to a method for a vehicle avoiding an obstacle.

BACKGROUND

An unmanned vehicle requires to sense environment during travelling. Generally, a camera provided on the unmanned vehicle collects environment images, and a laser radar is also provided on the unmanned vehicle to measure a distance between the vehicle and an object in the front. An on-board host of the unmanned vehicle may process the environmental images collected by the camera and data fed back by the laser radar to plan an obstacle avoiding path of the vehicle.

SUMMARY

According to exemplary embodiments of the disclosure, a method and an apparatus for a vehicle avoiding an obstacle, an electronic device, and a computer storage medium are provided.

In a first aspect of the disclosure, a method for a vehicle avoiding an obstacle is provided. The method includes: obtaining size information of a vehicle; obtaining a safe distance in a traveling direction of the vehicle; determining an obstacle screening area of the vehicle at least based on the size information and the safe distance; and determining an obstacle avoiding path of the vehicle in response to determining that the obstacle is located in the obstacle screening area.

In a second aspect of the disclosure, an electronic device is provided. The electronic device includes: one or more processors and a memory. The memory is configured to store one or more programs. The one or more processors are configured to: obtain size information of a vehicle; obtain a safe distance in a traveling direction of the vehicle; determine an obstacle screening area of the vehicle at least based on the size information and the safe distance; and determine an obstacle avoiding path of the vehicle in response to determining that the obstacle is located in the obstacle screening area.

In a third aspect of the disclosure, a computer readable storage medium having a computer program stored thereon is provided. The computer program is configured to implement a method for a vehicle avoiding an obstacle when executed by a processor, and the method comprises: obtain size information of a vehicle; obtain a safe distance in a traveling direction of the vehicle; determine an obstacle screening area of the vehicle at least based on the size information and the safe distance; and determine an obstacle avoiding path of the vehicle in response to determining that the obstacle is located in the obstacle screening area.

It should be understood that, the contents described in the Summary are not intended to identify key or important features of embodiments of the disclosure, nor is it intended to limit the scope of the disclosure. Other features of the disclosure will become apparent from the following description.

BRIEF DESCRIPTION OF THE DRAWINGS

The above and other features, advantages and aspects of respective embodiments of the disclosure will become more apparent with reference to accompanying drawings and following detailed illustrations. In the accompanying drawings, the same or similar numeral references represent the same or similar elements, in which.

DETAILED DESCRIPTION

Figure 1:
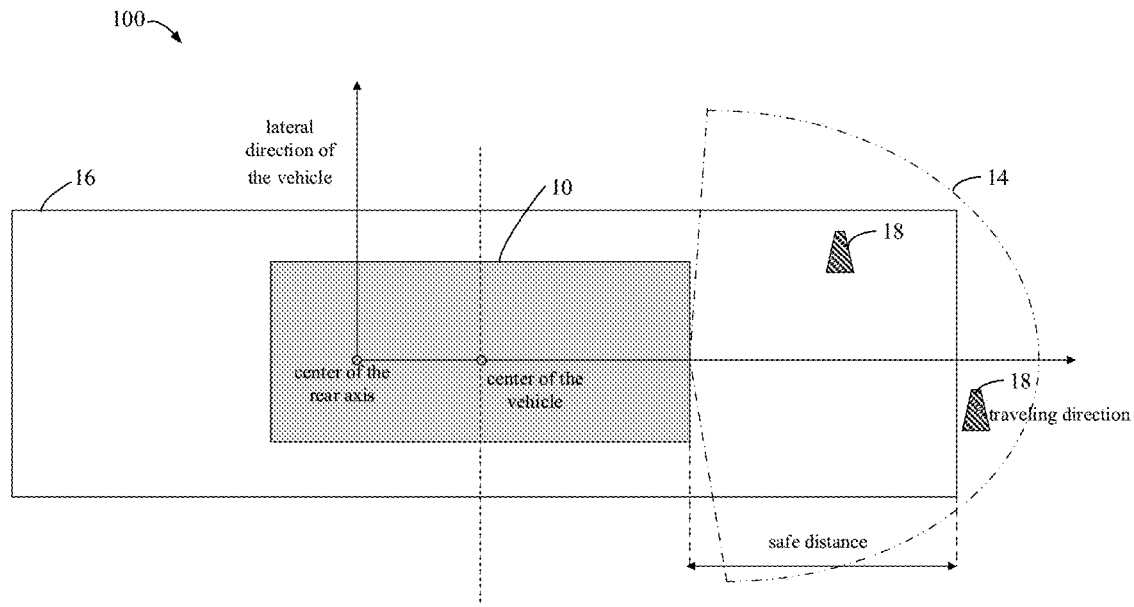
FIG. 1 is a schematic diagram illustrating an exemplary environment where a method for a vehicle avoiding an obstacle is implemented according to embodiments of the disclosure.

Embodiments of the disclosure will be described in more detail below with reference to the accompanying drawings. Although certain embodiments of the disclosure are illustrated in the accompanying drawings, it should be understood that the disclosure may be implemented in various manners without being limited by the embodiments elaborated herein. On the contrary, embodiments are provided to make the disclosure more thorough and complete. It should be understood that, the accompanying drawings and embodiments of the disclosure are merely used for exemplary purposes, and are not used to limit the protection scope of the disclosure.

In the description of embodiments of the disclosure, the term "includes" and its equivalents should be understood as an open "include" (a non-exclusive "include"), that is, "include but not limited to". The term "based on" should be understood as "based at least in part (at least partially based on)". The term "an embodiment" or "the embodiment" should be understood as "at least one embodiment". The terms "first", "second", and the like may refer to different or the same objects. Other explicit and implicit definitions may also be included below.

As mentioned above, an unmanned driving vehicle is generally provided with sensing devices to obtain information related to road conditions. For example, a vehicle is generally provided with a sensor to detect an obstacle. The sensor may include, such as, various cameras, radar sensing devices, and infrared sensors. The camera may sense the obstacle around the vehicle by using visual images and image processing technologies. The camera may include various types of cameras, such as a monocular camera, a binocular camera, and a wide-angle camera. A vehicle video monitoring system may be arranged based on multiple factors, such as an installation position (such as front, rear or lateral), a measurement requirement and cost of the camera. The radar sensing device may include, such as, a millimeter wave radar, a laser radar, and an ultrasonic wave radar. A radar monitoring system of the vehicle may be arranged based on multiple factors, such as an installation position, a measurement requirement and cost of the radar.

Through these sensing devices, environment information around the vehicle may be obtained to provide valuable information for vehicle driving. However, the information detected by these sensing devices is used for driving route decision-making, frequent braking or turning of the vehicle may be caused, thereby reducing driving experience of the vehicle. For example, when image data collected by the camera is used for the driving route decision-making, due to a low measurement accuracy of the camera or an error generated when image processing such as obstacle recognition is performed on the image collected by the camera, a recognized position of the obstacle may be incorrectly positioned and inappropriately deviated from an actual position of the obstacle. In this case, the vehicle may be excessively "cautious", causing excessive control for the vehicle and frequent braking of the vehicle. It is expected that one or more of these problems may be improved.

Description will be made in detail below to embodiments of the disclosure with reference to accompanying drawings.

FIG. 1 is a schematic diagram illustrating an exemplary environment 100 where a method for a vehicle avoiding an obstacle is implemented according to embodiments of the disclosure. FIG. 1 illustrates a schematic diagram of a vehicle driving scene. Features illustrated in the accompanying drawings are described as follows. A vehicle 10 is schematically illustrated in FIG. 1, such as illustrated as a block area, and a front side of the vehicle is a traveling direction of the vehicle. A coordinate system and a position of a center of the vehicle are also illustrated in FIG. 1. For an example, a center of a rear axis of the vehicle is taken as an origin of the coordinate system, and the traveling direction of the vehicle (i.e. a longitudinal axis of the vehicle or body) is taken as a transverse axis of the coordinate system. In addition, a vision sensor (e.g., a camera, not labeled in FIG. 1) is also schematically illustrated, and is installed at the front side of the vehicle 10. An image capturing area (i.e., a detecting area) of the camera is adaptively illustrated by an area 14 formed by double dots line. In addition, the obstacle 18 is schematically illustrated in the traveling direction of the vehicle.

Figure 3:
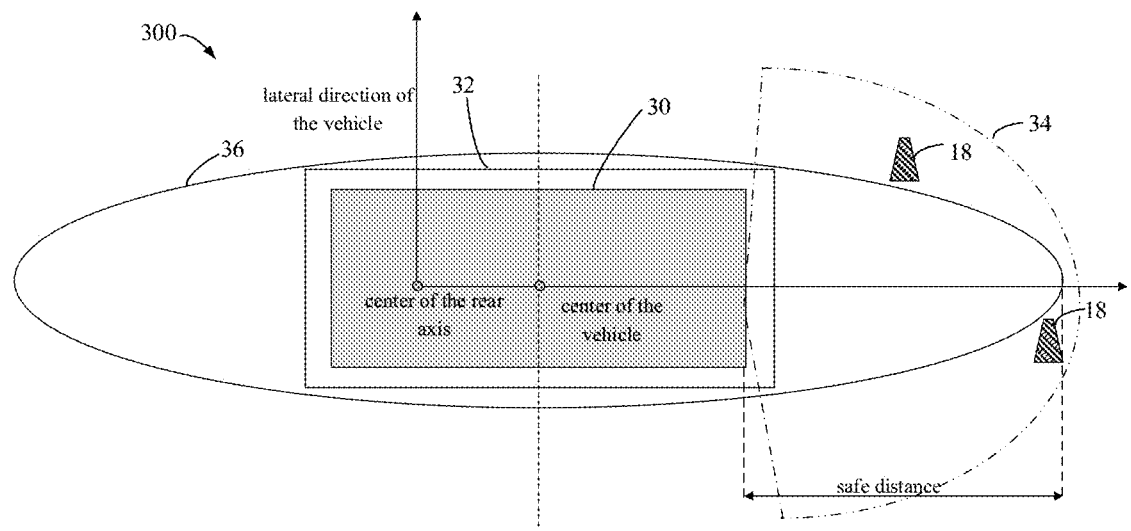
FIG. 3 is a schematic diagram illustrating an exemplary environment where a method for a vehicle avoiding an obstacle is implemented according to another embodiment of the disclosure.
Figure 4:
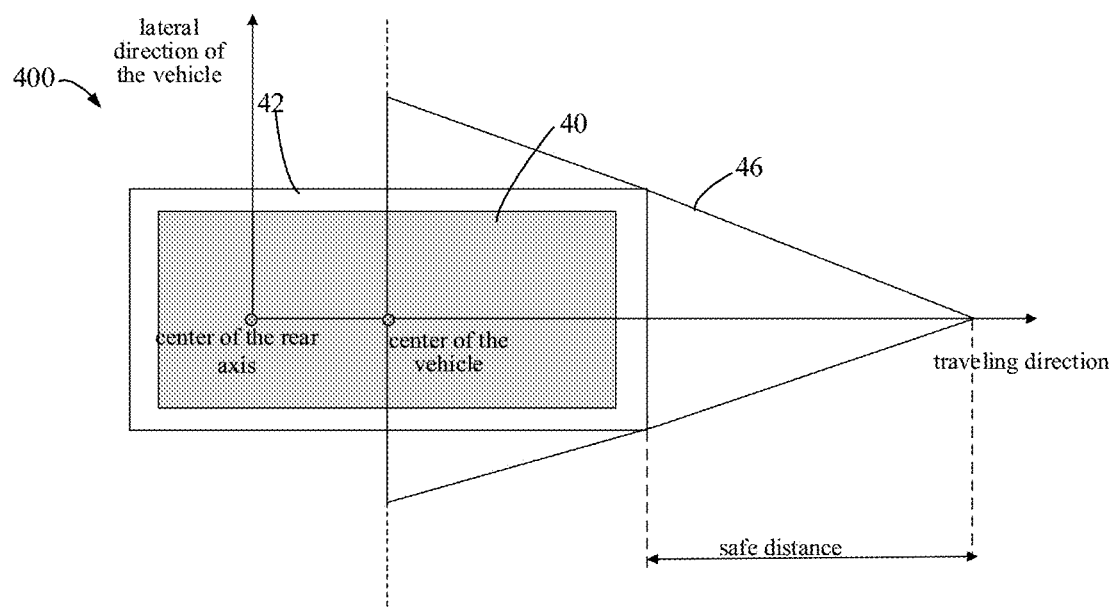
FIG. 4 is a schematic diagram illustrating an exemplary environment where a method for a vehicle avoiding an obstacle is implemented according to another embodiment of the disclosure.
Figure 5:
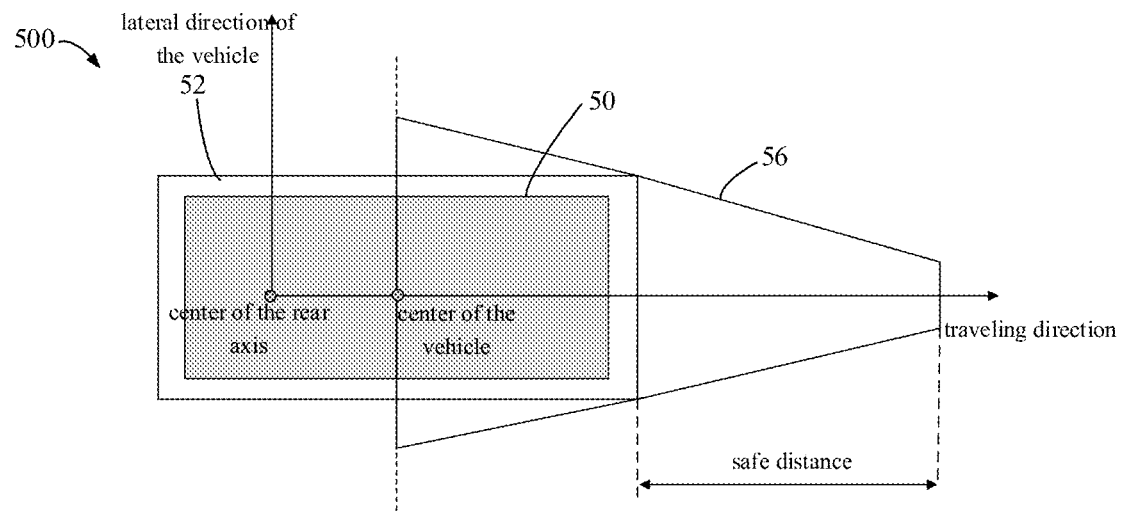
FIG. 5 is a schematic diagram illustrating an exemplary environment where a method for a vehicle avoiding an obstacle is implemented according to another embodiment of the disclosure.

It is worth noting that, FIG. 1 is merely exemplary for convenience of illustrating and describing embodiments according to the disclosure. Although the front side of the vehicle as the traveling direction is taken as an example in the accompanying drawings, it should be understood by the skilled in the art that, when the vehicle is reversing or turning, embodiments of the disclosure may be implemented in a similar manner by means of a sensing device provided on a rear side or lateral side of the vehicle. Although only the vision sensor provided on the vehicle is illustrated in the accompanying drawings, it should be understood by the skilled in the art that the vision sensor may be replaced by other sensing devices such as a sensing radar or an infrared sensor, or combined with other sensing devices, to form the detecting area. In following description of the disclosure, description is made to a principle of embodiments of the disclosure merely by taking an area which the vision sensor senses as an example. It should be understood by the skilled in the art that, for other sensing devices, embodiments of the disclosure may be implemented in a similar manner as described herein. Although only the detecting area of the vision sensor provided on the front side of the vehicle is illustrated in illustrated embodiments, it should be understood that the detecting area is merely an example, and the vision sensor may be provided on the lateral or rear side of the vehicle. In following description of the disclosure, description will be made to the principle of embodiments of the disclosure merely based on the front side and a front detecting area formed by the vision sensor. It should be understood by the skilled in the art that, detecting areas of other directions of the vehicle (especially areas related to the traveling direction) may be combined with the front detecting area illustrated to form the detecting area. Detecting areas of other sensing devices of the vehicle (especially the areas related to the traveling direction) may also be combined with the front detecting area illustrated to form the detecting area. In addition, following embodiments of FIGS. 3-5 are also illustrated in a similar manner to the embodiment illustrated in FIG. 1. Therefore, description regarding the features illustrated in FIG. 1 is equally applicable to embodiments illustrated in FIGS. 3-5.

As illustrated in FIG. 1, the vehicle 10 travels in the traveling direction. The detecting area 14 is formed by the sensor provided on the vehicle. In the illustrated embodiment, the sensor is the vision sensor (such as the camera). It should be understood that the detecting area herein is only exemplary. In some embodiments, there are multiple vision sensors, and the multiple vision sensors may be combined to form the detecting area. In another embodiment, one or more vision sensors may be combined with other sensors to form the detecting area together. In another embodiment, the same and/or different types of sensors located at different positions of the vehicle may be combined to form the detecting area together. To simplify the description, in the illustrated embodiment, merely the detecting area 14 formed by one vision sensor is illustrated. In another embodiment, multiple areas obtained by multiple sensors may be combined to form the detecting area.

Figure 2:
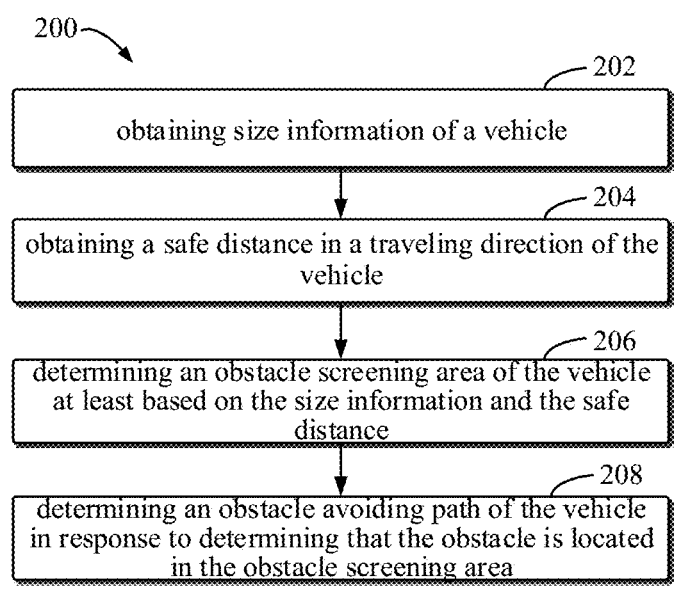
FIG. 2 is a flow chart illustrating a method for a vehicle avoiding an obstacle according to embodiments of the disclosure.

Description will be made below in detail to a flow chart of a method 200 for a vehicle avoiding an obstacle according to embodiments of the disclosure. As illustrated in FIG. 2, the method 200 for the vehicle avoiding the obstacle includes multiple actions.

At block 202, size information of a vehicle is obtained. In some embodiments, the size information of the vehicle may include a longitudinal length size of the vehicle and a transverse length size of the vehicle. In some embodiments, a relative position of a center of the vehicle may be determined based on longitudinal size information of the vehicle and transverse size information of the vehicle. In a case of automatic driving of the vehicle, a position of the center of the rear axis of the vehicle may also be obtained. As an example, as illustrated in FIG. 1, a coordinate system with the center of the rear axis of the vehicle as a coordinate origin may be created. In other embodiments, a center of a front axis or a geometrical center of the vehicle may also be as the coordinate origin. When a transverse axis and a longitudinal axis of the vehicle are determined, a leading edge position, a trailing edge position and a side edge position of the vehicle may be easily determined At block 204, a safe distance in a traveling direction of the vehicle is obtained. The term "safe distance in the traveling direction" refers to a distance for keeping the vehicle safe when the vehicle travels to a position with a safe distance away from a current position along the traveling direction. For example, in some application scenes, in a case that there is a fixed obstacle in the traveling direction of the vehicle, the safe distance may be a distance that the vehicle may travel without colliding with the fixed obstacle when the vehicle travels from the current position to a vicinity of the fixed obstacle. In another application scene, in a case that there is a mobile obstacle (such as another vehicle) in front of the vehicle, the safe distance may be a distance traveled by the vehicle when the vehicle travels from the current position to the vicinity of the mobile obstacle and keeps a minimum safe distance from the mobile obstacle.

In some embodiments, the safe distance may be determined based on at least one of: a traveling velocity of the vehicle; a driving safety index of the vehicle; or a passenger comfort index. The driving safety index of the vehicle is related to performances of the vehicle, for example, including a braking performance of the vehicle and a mass of the vehicle, and a value of the driving safety index may be preset by a manufacturer or based on empirical data. The passenger comfort index is related to a feeling of a passenger in the vehicle, such as a reference coefficient that the passenger does not feel sick or dizzy while ensuring the safety of the vehicle when the vehicle is braked, and a value of the passenger comfort index may be preset based on empirical data. The traveling velocity of the vehicle may be obtained by a velocity sensor or an acceleration sensor of the vehicle. It should be understood that, the safe distance may be conveniently determined based on one or more of these parameters.

At block 206, an obstacle screening area of the vehicle is determined at least based on the size information and the safe distance. The term "obstacle screening area" refers to an area located in the traveling direction of the vehicle. An obstacle avoiding path is planned based on the obstacle in the area in real time during traveling the vehicle. The size information and the safety distance are configured to determine the obstacle screening area, such that the obstacle screening area is related to the safety distance in the traveling direction of the vehicle. In this case, a size of the obstacle screening area may be reduced as much as possible, or even minimized on the premise of ensuring driving safety.

At block 208, an obstacle avoiding path of the vehicle is determined in response to determining that the obstacle is located in the obstacle screening area. Based on the obstacle screening area determined at block 206, the obstacle avoiding path may be re-planned when the obstacle falls within the obstacle screening area, to avoid collision between the vehicle and the obstacle. In this way, the obstacle avoiding efficiency may be improved based on the determined obstacle screening area.

In some embodiments, when the obstacle avoiding path of the vehicle is determined, the detecting area around the vehicle from the sensor may be obtained, and the obstacle in an area that is in the detecting area and corresponding to the obstacle screening area may be recognized. In this case, since the obstacle screening area is determined at least based on the safe distance, the size of the obstacle screening area may be reduced as much as possible, or even minimized. In addition, by recognizing the obstacle in the area that is in the detecting area and corresponding to the obstacle screening area, the size of the detecting area obtained from the sensor may be effectively and reasonably limited, thereby improving the obstacle avoiding efficiency and improving the driving experience of the user while ensuring the safety.

Returning to FIG. 1, in the embodiment illustrated in FIG. 1, the obstacle screening area 16 of the vehicle is exemplarily determined as a rectangular shape. As illustrated in FIG. 1, two obstacles 18 are schematically illustrated in front of the vehicle. After the obstacle screening area 16 is determined, the upper obstacle 18 in FIG. 1 falls into the obstacle screening area 16, while the lower obstacle 18 in FIG. 1 does not fall into the obstacle screening area 16. In this case, the vehicle requires to consider the upper obstacle 18 in FIG. 1 and re-plan the obstacle avoiding path. Meanwhile, since the lower obstacle 18 in FIG. 1 not falling into the obstacle screening area 16 is not considered, the obstacle avoiding efficiency is improved on the basis of ensuring the driving safety of the vehicle. As illustrated in FIG. 1, comparing with the detecting area 14, the obstacle screening area 16 is reduced. Therefore, the size of the detecting area is limited while the driving experience of the user is improved.

In some embodiments, when the obstacle screening area is determined, the shape of the obstacle screening area requires to be determined by considering a positioning accuracy of the sensor of vehicle to position the obstacle in the detecting area of the sensor. For example, for the sensor such as a distance measurement sensor or an imaging sensor, there are more or less various errors or deviations in the sensor, thereby causing a measurement error of the obstacle. For example, for the camera, the longer the distance, the worse the measurement accuracy is. In this case, determining the obstacle screening area includes: determining a shape of the obstacle screening area based on the positioning accuracy of the sensor of the vehicle to position the obstacle in the detecting area of the sensor. Therefore, the obstacle avoiding efficiency during driving may be further improved to avoid frequent braking.

In some embodiments, the obstacle screening area is formed as a tapered shape, and the tapered shape tapers from the center of the vehicle along the longitudinal axis of the vehicle toward the traveling direction of the vehicle. For example, the obstacle screening area of the vehicle may be determined to be largest at the center of the vehicle and gradually narrowing from the center of the vehicle toward the front side of the vehicle along the longitudinal axis of the vehicle (or the traveling direction of the vehicle). With such shape, the obstacle screening area removes areas located on the lateral sides in the traveling direction of the vehicle (the positioning accuracy of the sensor is generally poor in these areas). Therefore, the size of the obstacle screening area is further reduced while ensuring safety, and the obstacle avoiding efficiency of the driving is further improved.

Description will be further made below to several embodiments 300, 400, and 500 of shape optimization for the obstacle screening area with reference to FIGS. 3-5. FIGS. 3-5 are schematic diagrams illustrating exemplary environments where a method for a vehicle avoiding an obstacle is implemented according to embodiments of the disclosure.

In some embodiments, obtaining the size information of the vehicle may also include: obtaining an expansion parameter of the vehicle. The term "expansion parameter" refers to a certain enlargement regarding the size of the vehicle. In embodiments of FIGS. 3-5, blocks 30, 40, and 50 are schematic diagrams of the vehicle, and blocks with reference numerals 32, 42, and 52 are schematic size blocks of the expanded vehicle. The expansion parameter of the vehicle may be preset based on experience data of a vehicle size. For example, different vehicle types, models and sizes may have different expansion parameters.

In the embodiment 300 illustrated in FIG. 3, the obstacle screening area 36 of the vehicle may be formed as a shape of an ellipse. As illustrated in FIG. 3, a center, a long axis and a short axis of the ellipse are determined. The center of the ellipse is located at the center of the vehicle. The long axis of the ellipse is located at the longitudinal axis of the vehicle. The short axis of the ellipse is located at a transverse axis perpendicular to the longitudinal axis and passing through the center of the vehicle. A size of the long axis and a size of the short axis of the ellipse are determined based on the size information and the safety distance. The obstacle screening area with the shape of the ellipse may be determined after the size of the long axis and the size of short axis. The obstacle screening area may be further limited and reduced by forming the obstacle screening area as the shape of the ellipse. As illustrated in FIG. 3, by forming the obstacle screening area as the shape of the ellipse, both of the two obstacles 18 in FIG. 3 do not fall into the obstacle screening area. Therefore, in obstacle avoiding computing of the vehicle, the two obstacles 18 are not considered for the time being, thereby improving the obstacle avoiding efficiency. In addition, by selecting the shape of the ellipse, computational complexity may be effectively reduced, and computational efficiency is improved.

It should be noted that, the method for determining the shape of the ellipse is merely exemplary, and other methods for determining the shape of the ellipse may be obvious for the skilled in the art. In addition, although FIG. 3 illustrates the obstacle screening area by taking the shape of the ellipse as an example, the shape of the ellipse herein may also be replaced by other conic shapes, such as a parabola and a hyperbola.

In the embodiment 400 illustrated in FIG. 4, the obstacle screening area 46 of the vehicle may be formed as a shape of an isosceles triangle. As illustrated in FIG. 4, a baseline and a vertex of the isosceles triangle are determined. The baseline of the isosceles triangle is located at a transverse axis perpendicular to the longitudinal axis of the vehicle and passing through the center of the vehicle. A vertex of the isosceles triangle is located at the longitudinal axis of the vehicle. A position of the vertex and a size of the baseline of the isosceles triangle are determined based on the size information and the safety distance. The obstacle screening area with the shape of the isosceles triangle is determined based on the vertex and the baseline of the isosceles triangle. After the vertex and the baseline of the isosceles triangle are determined, the obstacle screening area with the isosceles triangle may be determined. By forming the obstacle screening area as the shape of the isosceles triangle, the obstacle screening area may be further limited and reduced. As illustrated in FIG. 4, by forming the obstacle screening area as the shape of the isosceles triangle, the size of the obstacle screening area is reduced while ensuring safety, thereby improving the obstacle avoiding efficiency.

It should be noted that, the method for determining the shape of the isosceles triangle is merely exemplary, and other methods for determining the shape of the isosceles triangle may be obvious for the skilled in the art. In addition, although FIG. 4 illustrates the obstacle screening area by taking the shape of the isosceles triangle as an example, the shape of the isosceles triangle here may also be replaced by other triangle shapes. For example, in some embodiments, after the vertex is determined based on the safe distance of the vehicle, the position of the vertex may be moved in a direction perpendicular to the traveling direction to determine the shape of the triangle. When the shape of the triangle is determined in relation to the positioning accuracy of the sensor, the obstacle avoiding efficiency may be further improved.

In the embodiment 500 illustrated in FIG. 5, the obstacle screening area 56 of the vehicle may be formed as a shape of an isosceles trapezoid. As illustrated in FIG. 5, a baseline and a topline of the isosceles trapezoid are determined. The baseline of the isosceles trapezoid is located at a transverse axis perpendicular to the longitudinal axis of the vehicle and passing through the center of the vehicle. An intersection point of non-parallel opposite sides of the isosceles trapezoid is located at the longitudinal axis of the vehicle. A size of the topline and a size of the baseline of the isosceles trapezoid are determined based on the size information and the safety distance. The obstacle screening area with the shape of the isosceles trapezoid is determined based on the size of the topline and the size of the baseline of the isosceles trapezoid. The obstacle screening area with the shape of the isosceles trapezoid may be determined based on the size of the topline and the size of the baseline of the isosceles trapezoid. By forming the obstacle screening area as the shape of the isosceles trapezoid, the obstacle screening area may be further limited and reduced. As illustrated in FIG. 5, by forming the obstacle screening area as the shape of the isosceles trapezoid, the size of the obstacle screening area is reduced while ensuring safety, thereby improving the obstacle avoiding efficiency.

It should be noted that the method for determining the shape of the isosceles trapezoid is only exemplary, and other methods for determining the shape of the isosceles trapezoid may be obvious for the skilled in the art. In addition, although FIG. 5 illustrates the obstacle screening area by taking the shape of the isosceles trapezoid as an example, the shape of the isosceles trapezoid here may also be replaced by other trapezoid shapes.

It is worth noting that, the shape of the obstacle screening area in the traveling direction of the vehicle is merely illustrated in embodiments illustrated in FIGS. 4 and 5. The shape of the obstacle screening area in a backward direction of the vehicle may be obtained similarly.

Figure 6:
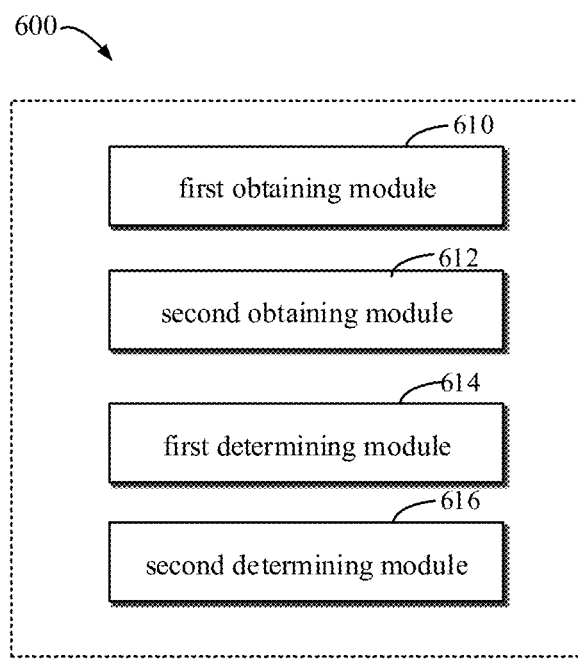
FIG. 6 is a block diagram illustrating an apparatus for a vehicle avoiding an obstacle according to another embodiment of the disclosure.

FIG. 6 is a block diagram illustrating an apparatus 600 for a vehicle avoiding an obstacle according to another embodiment of the disclosure. In some embodiments, the apparatus may be included in a computer device or implemented in the computer device. The apparatus 600 may be configured to execute the one or more step at blocks 300, 400 and 500. As illustrated in FIG. 6, the apparatus 600 may include: a first obtaining module 610, a second obtaining module 612, a first determining module 614, and a second determining module 618. The first obtaining module 610 is configured to obtain size information of a vehicle. The second obtaining module 612 is configured to obtain a safe distance in a traveling direction of the vehicle. The first determining module 614 is configured to determine an obstacle screening area of the vehicle at least based on the size information and the safe distance. The second determining module 618 is configured to determine an obstacle avoiding path of the vehicle in response to determining that the obstacle is located in the obstacle screening area.

In some embodiments, the second obtaining module 612 is configured to determine the safe distance based on at least one of: a traveling velocity of the vehicle; a driving safety index of the vehicle; or a passenger comfort index.

In some embodiments, the first determining module 614 is configured to: obtain a detecting area around the vehicle from a sensor; and recognize an obstacle in an area that is in the detecting area and corresponding to the obstacle screening area.

In some embodiments, the first determining module 614 is configured to: determine a shape of the obstacle screening area based on a positioning accuracy of a sensor of the vehicle to position an obstacle in a detecting area of the sensor.

In some embodiments, the obstacle screening area is formed as a tapered shape, and the tapered shape tapers from a center of the vehicle along a longitudinal axis of the vehicle toward the traveling direction of the vehicle.

In some embodiments, the first obtaining module 610 also includes: an expansion parameter obtaining sub-module, configured to obtain an expansion parameter of the vehicle.

In some embodiments, the first determining module 614 is configured to: determine a center, a long axis and a short axis of an ellipse, in which, the center of the ellipse is located at a center of the vehicle, the long axis of the ellipse is located at a longitudinal axis of the vehicle, and the short axis of the ellipse is located at a transverse axis perpendicular to the longitudinal axis and passing through the center of the vehicle, and a size of the long axis and a size of the short axis of the ellipse are determined based on the size information and the safety distance; and determine an obstacle screening area with a shape of the ellipse based on the long axis and the short axis.

In some embodiments, the first determining module 614 is configured to: determine a baseline and a vertex of an isosceles triangle, in which, the baseline of the isosceles triangle is located at a transverse axis perpendicular to a longitudinal axis of the vehicle and passing through a center of the vehicle, and a vertex of the isosceles triangle is located at the longitudinal axis of the vehicle, and a position of the vertex and a size of the baseline of the isosceles triangle are determined based on the size information and the safety distance; and determine an obstacle screening area with a shape of the isosceles triangle based on the vertex and the baseline of the isosceles triangle.

In some embodiments, the first determining module 614 is configured to: determine a baseline and a topline of an isosceles trapezoid, in which, the baseline of the isosceles trapezoid is located at a transverse axis perpendicular to a longitudinal axis of the vehicle and passing through a center of the vehicle, and an intersection point of non-parallel opposite sides of the isosceles trapezoid is located at the longitudinal axis of the vehicle, and a size of the topline and a size of the baseline of the isosceles trapezoid are determined based on the size information and the safety distance; and determine an obstacle screening area with a shape of the isosceles trapezoid based on the size of the topline and the size of the baseline of the isosceles trapezoid.

According to embodiments of the disclosure, the disclosure also provides an electronic device and a readable storage medium.

Figure 7:
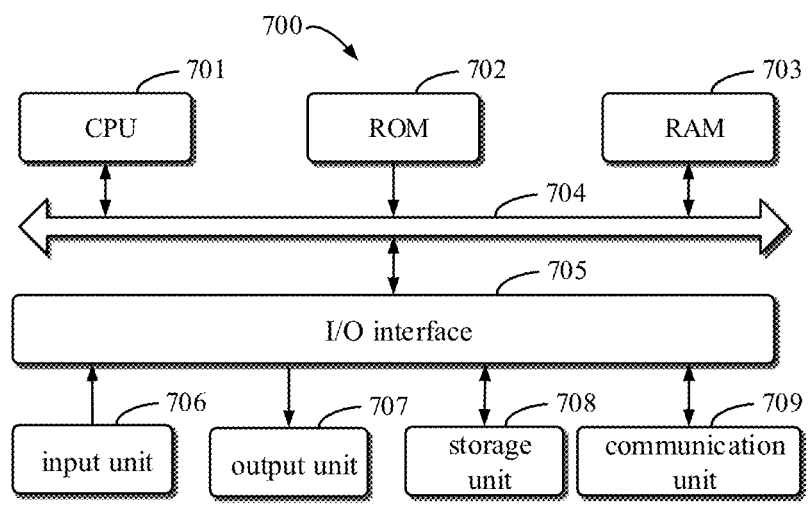
FIG. 7 is a block diagram illustrating an electronic device according to embodiments of the disclosure.

As illustrated in FIG. 7, FIG. 7 is a block diagram illustrating an electronic device according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

FIG. 7 is a block diagram illustrating a computing device 700 according to multiple embodiments of the disclosure. As illustrated in FIG. 7, the device 700 includes a central processing unit (CPU) 701, which may execute various appropriate acts and processing based on computer program instructions stored in a read-only memory (ROM) 702 or computer program instructions loaded from a storage unit 708 to a random-access memory (RAM) 703. In the RAM 703, various programs and data needed for the operation of the device 700 may be stored. The CPU 701, the ROM 702, and the RAM 703 are connected to each other through a bus 704. An input/output (I/O) interface 705 is also connected to the bus 704.

Multiple components in the device 700 are connected to the I/O interface 705, including: an input unit 706, such as a keyboard, a mouse, etc.; an output unit 707, such as various types of displays, speakers, etc.; the storage unit 708, such as a disk, a CD, etc.; and a communication unit 709, such as a network card, a modem, a wireless communication transceiver, etc. . . . The communication unit 709 allows the device 700 to exchange information/data with other devices via computer networks such as the Internet and/or various telecommunications networks.

The processing unit 701 executes the various methods and procedures described above, such as the method 200. For example, in some embodiments, the method 200 may be implemented as computer software programs, which are physically contained in a machine-readable medium, such as the storage unit 708. In some embodiments, some or all of the computer programs may be loaded and/or installed on the device 700 via the ROM 702 and/or the communication unit 709. The computer programs may execute one or more acts or steps of the method 200 described above when loaded to the RAM 703 and executed by the CPU 701. Alternatively, in other embodiments, the CPU 701 may be configured to execute the method 200 by any other appropriate ways (such as, by means of a firmware).

The above functions described herein may be executed at least partially by one or more hardware logic components. For example, without limitation, exemplary types of hardware logic components, including a field-programmable gate array (FPGA), an application-specific integrated circuit (ASIC), an application specific standard product (ASSP), a system on chip (SOC), a load programmable logic device (CPLD) and so on, may be used.

The program codes for implementing the method of embodiments of the present disclosure may be written in any combination of one or more program languages. These program codes may be provided for a processor or a controller of a general-purpose computer, a special-purpose computer, or other programmable data-processing devices, such that the functions/operations regulated in the flow charts and/or block charts are implemented when the program codes are executed by the processor or the controller. The program codes may be completely executed on the machine, partly executed on the machine, partly executed on the machine as a standalone package and partly executed on a remote machine or completely executed on a remote machine or a server.

In the context of the present disclosure, the machine readable medium may be a tangible medium, which may include or store the programs for use of an instruction execution system, apparatus or device or for use in conjunction with the instruction execution system, apparatus or device. The machine readable medium may be a machine readable signal medium or a machine readable storage medium. The machine readable medium may include but not limited to electronic, magnetic, optical, electromagnetic, infrared, or semiconductor systems, apparatuses or devices, or any appropriate combination of the foregoing contents. A more detailed example of the machine readable storage medium includes electrical connections based on one or more lines, a portable computer disk, a hard disk, a random access memory (RAM), a read-only memory (ROM), an erasable programmable read only memory (an EPROM or a flash memory), an optical fiber, a compact disc read-only memory (CD-ROM), an optical storage device, a magnetic storage device, or any appropriate combination of the above contents.

In addition, although respective act or step is described in a particular sequence, it should be understood that such act or step are required to be executed in the specified or sequential order as illustrated, or all illustrated acts or steps are required to be executed to achieve a desired result. Under certain environment, multitasking and parallel processing may be beneficial. In the same way, although several specific implementation details are included in the above discussion, these should not be interpreted as limitations of the scope of the present disclosure. Certain features described in the context of a single embodiment may also be in a combination manner to be implemented in a single implementation. On the contrary, the various features described in the context of a single implementation may also be implemented in multiple implementations individually or in any appropriate sub-combination.

Although language specific to structural features and/or method logic actions has been employed to describe the embodiments of the present disclosure, it should be understood that the subject matter defined in the appended claims is not necessarily limited to the specific features or acts described above. On the contrary, the specific features or acts described above are merely an exemplary form for implementing the claims.

What is claimed is:

1. A method for an unmanned driving vehicle avoiding an obstacle, implemented by a computer on the unmanned driving vehicle, comprising:
    obtaining size information of the vehicle;
    obtaining a safe distance in a traveling direction of the vehicle;
    determining an obstacle screening area of the vehicle at least based on the size information and the safe distance; and
    determining an obstacle avoiding path of the vehicle in response to determining that the obstacle is located in the obstacle screening area, and controlling the unmanned driving vehicle according to the obstacle avoiding path;
    wherein determining the obstacle avoiding path of the vehicle further comprises:
    obtaining a detecting area around the vehicle from a sensor; and
    recognizing an obstacle in an overlapping area between the detecting area and the obstacle screening area, and not recognizing any obstacle in an area in a non-overlapping area between the detecting area and the obstacle screening area.

2. The method of claim 1, wherein the safe distance is determined based on at least one of:
    a traveling velocity of the vehicle;
    a driving safety index of the vehicle; or
    a passenger comfort index.

3. The method of claim 1, wherein determining the obstacle screening area comprises:
    determining a shape of the obstacle screening area based on a positioning accuracy of a sensor of the vehicle to position an obstacle in a detecting area of the sensor.

4. The method of claim 3, wherein the obstacle screening area is formed as a tapered shape, and the tapered shape tapers from a center of the vehicle along a longitudinal axis of the vehicle toward the traveling direction of the vehicle.

5. The method of claim 1, wherein obtaining the size information of the vehicle comprises: obtaining an expansion parameter of the vehicle.

6. The method of claim 1, wherein determining the obstacle screening area of the vehicle comprises:
    determining an ellipse, a direction of a longitudinal axis of the vehicle as a direction of a major axis of the ellipse, and a direction of a transverse axis perpendicular to the longitudinal axis and passing through the center of the vehicle as a direction of a minor axis of the ellipse, and determining a distance of the center of the ellipse to a vertex point where the major axis intersects the ellipse and a distance of the center of the ellipse to a co-vertex point where the minor axis intersects the ellipse based on the size information and the safe distance; and
    determining an obstacle screening area with a shape of the ellipse based on the distance of the center of the ellipse to the vertex point where the major axis intersects the ellipse and the distance of the center of the ellipse to the co-vertex point where the minor axis intersects the ellipse.

7. The method of claim 1, wherein determining the obstacle screening area of the vehicle comprises:
    determining a baseline and a vertex of an isosceles triangle, wherein, the baseline of the isosceles triangle is located at a transverse axis perpendicular to a longitudinal axis of the vehicle and passing through a center of the vehicle, and the vertex of the isosceles triangle is located at the longitudinal axis of the vehicle, and a position of the vertex and a size of the baseline of the isosceles triangle are determined based on the size information and the safe distance, and
    determining an obstacle screening area with a shape of the isosceles triangle based on the vertex and the baseline of the isosceles triangle.

8. The method of claim 1, wherein determining the obstacle screening area of the vehicle comprises:
    determining a baseline and a topline of an isosceles trapezoid, wherein, the baseline of the isosceles trapezoid is located at a transverse axis perpendicular to a longitudinal axis of the vehicle and passing through a center of the vehicle, and an intersection point of extended lines of non-parallel opposite sides of the isosceles trapezoid is located at the longitudinal axis of the vehicle, and a size of the topline and a size of the baseline of the isosceles trapezoid are determined based on the size information and the safe distance; and
    determining an obstacle screening area with a shape of the isosceles trapezoid based on the size of the topline and the size of the baseline of the isosceles trapezoid.

9. An electronic device, comprising:
    one or more processors; and
    a memory, configured to store one or more programs, wherein the one or more processors are configured to:
    obtain size information of an unmanned driving vehicle;
    obtain a safe distance in a traveling direction of the vehicle;

determine an obstacle screening area of the vehicle at least based on the size information and the safe distance; and determine an obstacle avoiding path of the vehicle in response to determining that the obstacle is located in the obstacle screening area, and control the unmanned driving vehicle according to the obstacle avoiding path;

wherein the one or more processors are further configured to:

obtain a detecting area around the vehicle from a sensor; and recognize an obstacle in an overlapping area between the detecting area and the obstacle screening area, and not recognize any obstacle in a non-overlapping area between the detecting area and the obstacle screening area.

10. The electronic device of claim 9, wherein the safe distance is determined based on at least one of:
a traveling velocity of the vehicle;
a driving safe index of the vehicle; or
a passenger comfort index.

11. The electronic device of claim 9, wherein the one or more processors are further configured to determine a shape of the obstacle screening area based on a positioning accuracy of a sensor of the vehicle to position an obstacle in a detecting area of the sensor.

12. The electronic device of claim 11, wherein the obstacle screening area is formed as a tapered shape, and the tapered shape tapers from a center of the vehicle along a longitudinal axis of the vehicle toward the traveling direction of the vehicle.

13. The electronic device of claim 9, wherein the one or more processors are further configured to obtain an expansion parameter of the vehicle.

14. The method of claim 9, wherein the one or more processors are further configured to:
determine an ellipse with a center of the vehicle as a center of the ellipse, a direction of a longitudinal axis of the vehicle as a direction of a major axis of the ellipse, and a direction of a transverse axis perpendicular to the longitudinal axis and passing through the center of the vehicle as a direction of a minor axis of the ellipse, and determine a distance of the center of the ellipse to a vertex point where the major axis intersects the ellipse and a distance of the center of the ellipse to a co-vertex point where the minor axis intersects the ellipse based on the size information and the safe distance; and determine an obstacle screening area with a shape of the ellipse based on the distance of the center of the ellipse to the vertex point where the major axis intersects the ellipse and the distance of the center of the ellipse to the co-vertex point where the minor axis intersects the ellipse.

15. The electronic device of claim 9, wherein the one or more processors are further configured to:
determine a baseline and a vertex of an isosceles triangle, wherein, the baseline of the isosceles triangle is located at a transverse axis perpendicular to a longitudinal axis of the vehicle and passing through a center of the vehicle, and the vertex of the isosceles triangle is located at the longitudinal axis of the vehicle, and a position of the vertex and a size of the baseline of the isosceles triangle are determined based on the size information and the safe distance, and determine an obstacle screening area with a shape of the isosceles triangle based on the vertex and the baseline of the isosceles triangle.

16. The electronic device of claim 9, wherein the one or more processors are further configured to:
determine a baseline and a topline of an isosceles trapezoid, wherein, the baseline of the isosceles trapezoid is located at a transverse axis perpendicular to a longitudinal axis of the vehicle and passing through a center of the vehicle, and an intersection point of extended lines of non-parallel opposite sides of the isosceles trapezoid is located at the longitudinal axis of the vehicle, and a size of the topline and a size of the baseline of the isosceles trapezoid are determined based on the size information and the safe distance; and determine an obstacle screening area with a shape of the isosceles trapezoid based on the size of the topline and the size of the baseline of the isosceles trapezoid.

17. A non-transitory computer readable storage medium having a computer program stored thereon, wherein the computer program is configured to implement a method for an unmanned driving vehicle avoiding an obstacle when executed by a processor, and the method comprises:
obtaining size information of the vehicle;
obtaining a safe distance in a traveling direction of the vehicle;
determining an obstacle screening area of the vehicle at least based on the size information and the safe distance; and determining an obstacle avoiding path of the vehicle in response to determining that the obstacle is located in the obstacle screening area, and controlling the unmanned driving vehicle according to the obstacle avoiding path;

wherein determining the obstacle avoiding path of the vehicle further comprises:
obtaining a detecting area around the vehicle from a sensor; and recognizing an obstacle in an overlapping area between the detecting area and the obstacle screening area, and not recognizing any obstacle in an area in a non-overlapping area between the detecting area and the obstacle screening area.

18. The storage medium of claim 17, wherein the safe distance is determined based on at least one of:
a traveling velocity of the vehicle;
a driving safe index of the vehicle; or
a passenger comfort index.

* * * * *